(12) United States Patent
Lee et al.

(10) Patent No.: US 9,121,928 B2
(45) Date of Patent: Sep. 1, 2015

(54) RADAR APPARATUS AND METHOD OF ASSEMBLING THE SAME

(71) Applicant: Mando Corporation, Pyeongtaek-si, Gyeonggi-do (KR)

(72) Inventors: Jae Eun Lee, Hwaseong-si (KR); Seung Un Choi, Seoul (KR); Min Seok Kim, Anyangi-si (KR); Seong Hee Jeong, Seoul (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 382 days.

(21) Appl. No.: 13/710,214

(22) Filed: Dec. 10, 2012

(65) Prior Publication Data

US 2013/0147657 A1    Jun. 13, 2013

(30) Foreign Application Priority Data

Dec. 9, 2011    (KR) .......................... 10-2011-0131901

(51) Int. Cl.
*G01S 13/00* (2006.01)
*G01S 7/03* (2006.01)

(52) U.S. Cl.
CPC *G01S 13/00* (2013.01); *G01S 7/032* (2013.01)

(58) Field of Classification Search
CPC ............ G01S 13/04; G01S 7/36; G01S 7/412
USPC .................................................. 342/175, 70–72
See application file for complete search history.

(56) References Cited

U.S. PATENT DOCUMENTS

| | | | |
|---|---|---|---|
| 5,288,949 A * | 2/1994 | Crafts | 174/250 |
| 5,481,268 A * | 1/1996 | Higgins | 342/70 |
| 6,452,550 B1 | 9/2002 | Channabasappa et al. | |
| 7,479,604 B1 * | 1/2009 | Smith et al. | 174/260 |
| 2003/0080836 A1 * | 5/2003 | Nagaishi et al. | 333/247 |
| 2003/0151549 A1 * | 8/2003 | Solbach | 342/368 |
| 2005/0151215 A1 * | 7/2005 | Hauhe et al. | 257/421 |
| 2006/0102374 A1 * | 5/2006 | Heide | 174/52.4 |
| 2006/0202312 A1 * | 9/2006 | Iijima et al. | 257/664 |
| 2006/0226415 A1 * | 10/2006 | Nishijima et al. | 257/11 |
| 2009/0194829 A1 * | 8/2009 | Chung et al. | 257/415 |
| 2012/0061133 A1 * | 3/2012 | Masuda | 174/261 |
| 2012/0104574 A1 * | 5/2012 | Boeck et al. | 257/660 |
| 2014/0191377 A1 * | 7/2014 | Reuter et al. | 257/664 |

FOREIGN PATENT DOCUMENTS

| | | |
|---|---|---|
| CN | 101076741 A | 11/2007 |
| EP | 0 884 799 A2 | 12/1998 |
| JP | 2000-059140 A | 2/2000 |
| JP | 2002-353842 A | 12/2002 |
| JP | 2010-139258 A | 6/2010 |

\* cited by examiner

*Primary Examiner* — John B Sotomayor
(74) *Attorney, Agent, or Firm* — McDermott Will & Emery LLP

(57) ABSTRACT

Disclosed are a radar apparatus having a reduced size and a reduced number of components, and a method of assembling the radar apparatus.

12 Claims, 7 Drawing Sheets

RADAR APPARATUS AND METHOD OF ASSEMBLING THE SAME

CROSS-REFERENCE TO RELATED APPLICATION

This application claims priority from and the benefit under 35 U.S.C. §119(a) of Korean Patent Application No. 10-2011-0131901, filed on Dec. 9, 2011, which is hereby incorporated by reference for all purposes as if fully set forth herein.

BACKGROUND OF THE INVENTION

1. Field of the Invention

The present invention relates to a radar apparatus.

2. Description of the Prior Art

A conventional radar apparatus includes a printed circuit board (PCB) on which a radar antenna module is mounted, and a PCB on which an RF circuit module is mounted, in which the radar antenna module mounted PCB and the RF circuit module mounted PCB are provided separately from each other. The radar apparatus further includes a transmission module configured to transmit signals between the radar antenna module mounted PCB and the RF circuit module mounted PCB. Accordingly, there is a problem in that the size of the radar apparatus is unavoidably increased.

In addition, because the conventional radar apparatus includes a connection module configured to interconnect a signal processing circuit module mounted PCB and the RF circuit module mounted PCB, there is also a problem in that that the size of the radar apparatus is unavoidably increased.

Due to this, there is also a problem in that a position for loading the radar apparatus on a vehicle is unavoidably limited.

SUMMARY OF THE INVENTION

Accordingly, the present invention has been made in an effort to solve the above-mentioned problems occurring in the prior art, and an object of the present invention is to provide a radar apparatus having a small size and a reduced number of components, and a method of assembling the same.

In order to accomplish this object, there is provided a radar apparatus including: a first printed circuit board having a top side on which a radar antenna module is mounted, and a bottom side on which a base band circuit module is mounted, wherein an RF module is wire-bonded to the first printed circuit board through a hole; a second printed circuit board on which a signal processing circuit module is mounted; and a base plate having a top side coupled with the bottom side of the first printed circuit board, and a bottom side coupled with the top side of the second printed circuit board.

A proactive member may be coupled to the top side of the first printed circuit board to protect the RF circuit module wire-bonded to the first printed circuit board.

One end of the RF circuit module may be connected with the radar antenna module, and the other end may be connected with the base band circuit module.

The base band circuit module may convert an analog signal output from the RF circuit module into a digital signal and input the digital signal to the signal processing circuit module, or may convert a digital signal output from the signal processing circuit module to an analog signal and input the analog signal to the RF circuit module.

According to another aspect of the present invention, there is provided a radar apparatus including: a first printed circuit board having a top side on which a radar antenna module is mounted, and a bottom side on which a base band circuit module is mounted, wherein an RF circuit module is wire-bonded and seated on the first printed circuit board; a second printed circuit board on which a signal processing circuit module is mounted; and a base plate having a top side coupled with the bottom side of the first printed circuit board, and a bottom side coupled with the top side of the second printed circuit board.

A protective member may be coupled to the top side of the first printed circuit board to protect the RF circuit module wire-bonded and seated on the first printed circuit board.

According to still another aspect of the present invention, there is provided a method of assembling a radar apparatus, including: mounting a radar antenna module on the top side of a first printed circuit board, and a base band circuit module on the bottom side of the first printed circuit board; coupling the bottom side of the first printed circuit board with the top side of a base plate; wire-bonding the first printed circuit board and an RF circuit module; and coupling the top side of a second printed circuit board with the bottom side of the base plate.

In the step of wire-bonding the RF circuit module, the RF circuit module may be seated on the base plate through the first printed circuit board, or directly seated on the first printed circuit board.

Following the step of wire-bonding the RF circuit module, the inventive method may further include: coupling a protective member to the top side of the first printed circuit board to protect the RF circuit module wire-bonded with the first printed circuit board.

According to the present invention, it is possible to provide a radar apparatus 100 configured to have a reduced size and a reduced number of components and a method of assembling the same.

Through this, a degree of freedom of a position where the radar apparatus 100 is loaded in a vehicle or the like can be enhanced.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, a third component may be "connected," "coupled," and "joined" between the first and second components, although the first component may be directly connected, coupled or joined to the second component.

Figure 1:
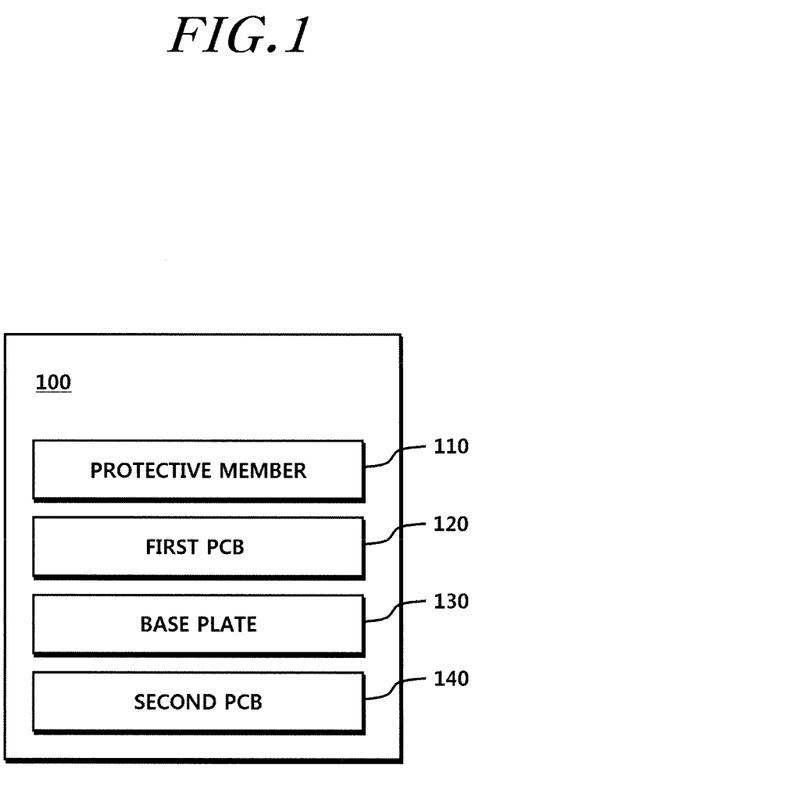
FIG. 1 is a block diagram of a radar apparatus according to a first exemplary embodiment of the present invention.

FIG. 1 is a block diagram of a radar apparatus 100 according to a first exemplary embodiment of the present invention.

Referring to FIG. 1, the radar apparatus 100 according to the first exemplary embodiment of the present invention includes: a first PCB 120 having a top side on which a radar antenna module is mounted and an RF (Radio Frequency) module is wire-bonded, and a bottom side on which a base band circuit module is mounted; a second PCB 140 on which a signal processing circuit module is mounted that is configured to conduct a signal processing for sensing surroundings using a signal (digital signal) output from a base band circuit module; and a base plate 130 having a top side coupled with the bottom side of the first PCB 120, and a bottom side coupled with the top side of the second PCB 140.

As described above, the radar apparatus 100 according to the first exemplary embodiment of the present invention is configured in such a manner that a radar antenna module and an RF circuit module are mounted on the top side of a single PCB (i.e., the first PCB 120) rather than being respectively mounted on separate PCBs. Accordingly, the radar apparatus 100 according to the embodiment of the present invention does not include a transition module for signal transmission between the radar antenna module and the RF circuit module. As a result, the radar apparatus 100 can be miniaturized.

In addition, in the radar apparatus 100 according to the first exemplary embodiment of the present invention, the base band circuit module is configured to be implemented on the bottom side of the first PCB 120 so that the signal processing circuit module mounted on the second PCB 140 can directly conduct a signal processing.

The signal transmission process with the above-mentioned configuration is as follows: an analog signal received through the radar antenna module mounted on the top side of the first PCB 120 is converted into a digital signal through the RF circuit module wire-bonded on the top side of the first PCB 120 and through the base band circuit module mounted on the bottom side of the first PCB 120, and then input into the signal processing circuit module of the second PCB 140.

The digital signal output from the signal processing circuit module of the second PCB 140 is converted into an analog signal through the base band circuit module mounted on the bottom side of the first PCB 120, and the converted analog signal is transmitted through the RF circuit module wire-bonded on the top side of the first PCB 120 and through the radar antenna module mounted on the top side of the first PCB 120.

Meanwhile, as the radar antenna module and the RF circuit module are implemented on the top side of the first PCB 120, and the base band circuit module is implemented on the bottom side of the first PCB 120 as described above, a signal transmitting/receiving function and an ADC (Analog Digital Converting)/DAC (Digital Analog Converting) function can be all executed through the single first PCB 120.

For this purpose, the first PCB 120 may be comprised of a high frequency band PCB section (for example, a Teflon PCB section) and a low frequency band PCB section (for example, an FR4 PCB section), in which the top side of the first PCB 120 is the high frequency band PCB section (for example, the Teflon PCB section), and the bottom side of the first PCB 120 is the low frequency band PCB section (for example, FR4 PCB section). Here, the terms, "high frequency" and "low frequency" are used in a relative concept.

As described above, in the radar apparatus 100 according to the first exemplary embodiment of the present invention, the RF circuit module in the first exemplary embodiment of the present invention may be implemented as one chip that includes a power amplifier, a distributer, a mixer, and a VCO (Voltage Controlled Oscillator) so that the radar antenna module and the RF circuit module can be configured to be mounted on the top side of a single PCB (i.e., the first PCB 120) rather than being mounted on separate PCBs, respectively.

Such a circuit module is wire-bonded to the first PCB 120 to be exposed to the first PCB 120. Accordingly, the radar apparatus 100 according to the first exemplary embodiment of the present invention may be provided with a protective member 110 configured to protect the RF circuit module 200, in which the protective member 110 may be coupled to the top side of the first PCB 120.

In addition, the RF circuit module is wire-bonded to the top side of the first PCB 120, in which the RF circuit module may be seated on the first PCB 120 or on the base plate 130.

Hereinbelow, the radar apparatus 100 in which the RF circuit module is seated on the first PCB 120 will be described with reference to FIGS. 2 and 3, and the radar apparatus 100 in which the RF circuit module is seated on the base plate 130 will be described with reference to FIGS. 4 and 5.

Figure 2:
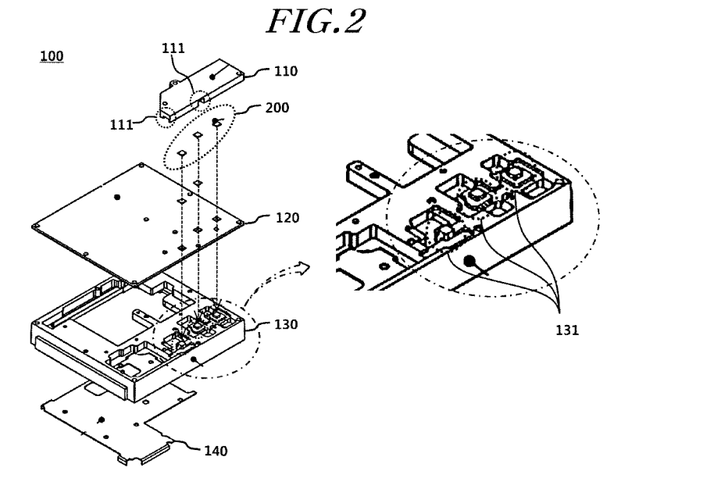
FIG. 2 is an exploded perspective view of the radar apparatus according to the first exemplary embodiment of the present invention.

FIG. 2 illustrates an exploded perspective view of the radar 100 apparatus according to the first exemplary embodiment of the present invention.

Referring to FIG. 2, the radar apparatus 100 includes: a first PCB 120 having a top side on which a radar antenna module is mounted, and a bottom side on which a base band circuit module is mounted, wherein an RF circuit module 200 is wire-bonded to the first PCB 120 through one or more holes; a second PCB 140 on which a signal processing circuit module is mounted; and a base plate 130 having a top side on which the RF circuit module 200 wire-bonded to the first PCB 120 through the holes is seated and assembled, the top side of the base plate 130 being coupled with the bottom side of the first PCB 120, and a bottom side which is coupled with the top side of the second PCB 140.

As described above, in the radar apparatus 100 according to the first exemplary embodiment of the present invention, the RF circuit module 200 in the first exemplary embodiment of the present invention may be implemented as one chip so that the radar antenna module and the RF circuit module 200 can be configured to be mounted on the top side of a single PCB (i.e., the first PCB 120) rather than being mounted on separate PCBs, respectively. Accordingly, hereinbelow, the RF circuit module may be referred to as an "RF device".

The RF circuit module 200 is wire-bonded with the first PCB 120 in such a manner that one end of the RF circuit module 200 can be connected with the radar antenna module mounted on the top side of the first PCB 120, and the other end of the RF circuit module 200 can be connected with the base band circuit module mounted on the bottom side of the first PCB 120.

The base band circuit module mounted on the bottom side of the first PCB 120 converts an analog signal output from the RF circuit module 200 into a digital signal and inputs the digital signal into the signal processing circuit module, or converts a digital signal output from the signal processing circuit module into an analog signal and inputs the analog signal into the RF circuit module 200.

On the top side of the base plate 130, at least one stud 131 is formed, so that the RF circuit module 200 can be seated and assembled through holes of the first PCB 120. The remaining space except the stud 131 may be provided as a space where the base band circuit module is mounted on the bottom side of the first PCB 120. Accordingly, a dead space in the radar apparatus 100 can be reduced such that the size of the radar apparatus 100 can be substantially reduced.

Meanwhile, the radar apparatus 100 according to the present exemplary embodiment may be provided with a protective member 110 that is coupled to the top side of the first PCB 120 to protect the RF circuit module 200 wire-bonded to the first PCB 120. Here, the protective member 110 may be formed from, for example, a metallic material.

The protective member 110 is formed with at least one groove 111 that serves as a passage for a wire for connecting the radar antenna module mounted on the top side of the first PCB 120 and the RF circuit module 200 wire-bonded to the top side of the first PCB 120.

Figure 3:
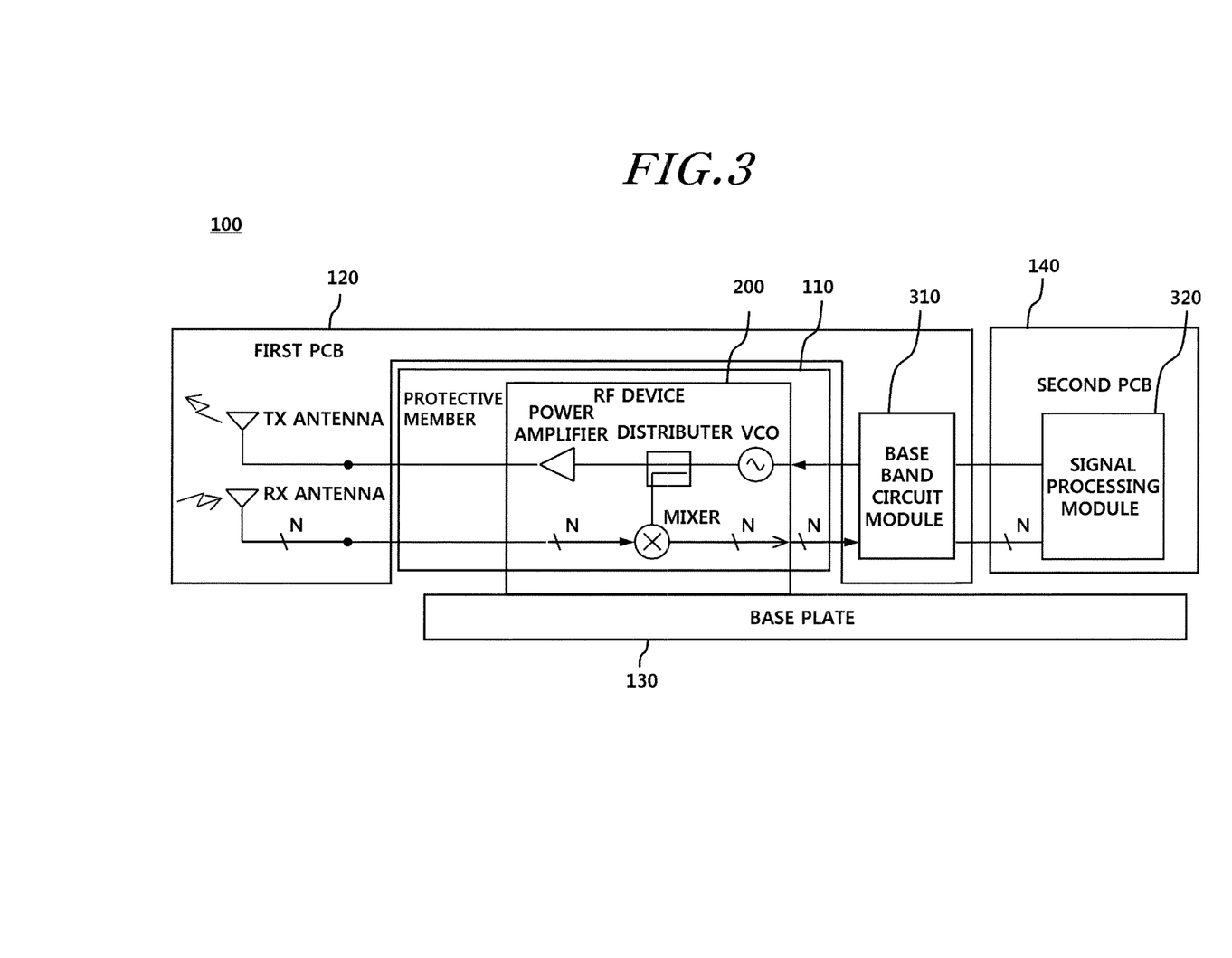
FIG. 3 is a view illustrating a circuit diagram of the radar apparatus according to the first exemplary embodiment of the present invention.

The radar apparatus 100 according to the first embodiment of the present invention described above with reference to FIG. 2 may be represented by a circuit diagram as illustrated in FIG. 3.

Referring to FIG. 3, on the top side of a first PCB 120, a radar antenna module (a Tx antenna and an Rx antenna) is mounted, and on the bottom side of the first PCB 120, a base band circuit module 310 is mounted. As illustrated in FIG. 2, a RF circuit module 200 is seated on a base plate 130 through the first PCB 120, and the RF circuit modules 200 are wire-bonded to the first PCB 120, thereby being connected with the first PCB 120 to form a circuit. In addition, the RF circuit module 200 is protected by the protective member 110.

A base band circuit module 310 mounted on the bottom side of the first PCB 120 is connected with a signal processing circuit module 320 mounted on the second PCB 140 to form a circuit.

In addition, the protective member 110, the first PCB 120, the RF circuit module 200, and the second PCB 140 are coupled (assembled) with each other by the base plate 130.

The base plate 130, which serves as a coupling structure and serves to seat the RF circuit modules 200, may also serve to transfer heat generated in the radar apparatus 100, and to shield noise.

Figure 4:
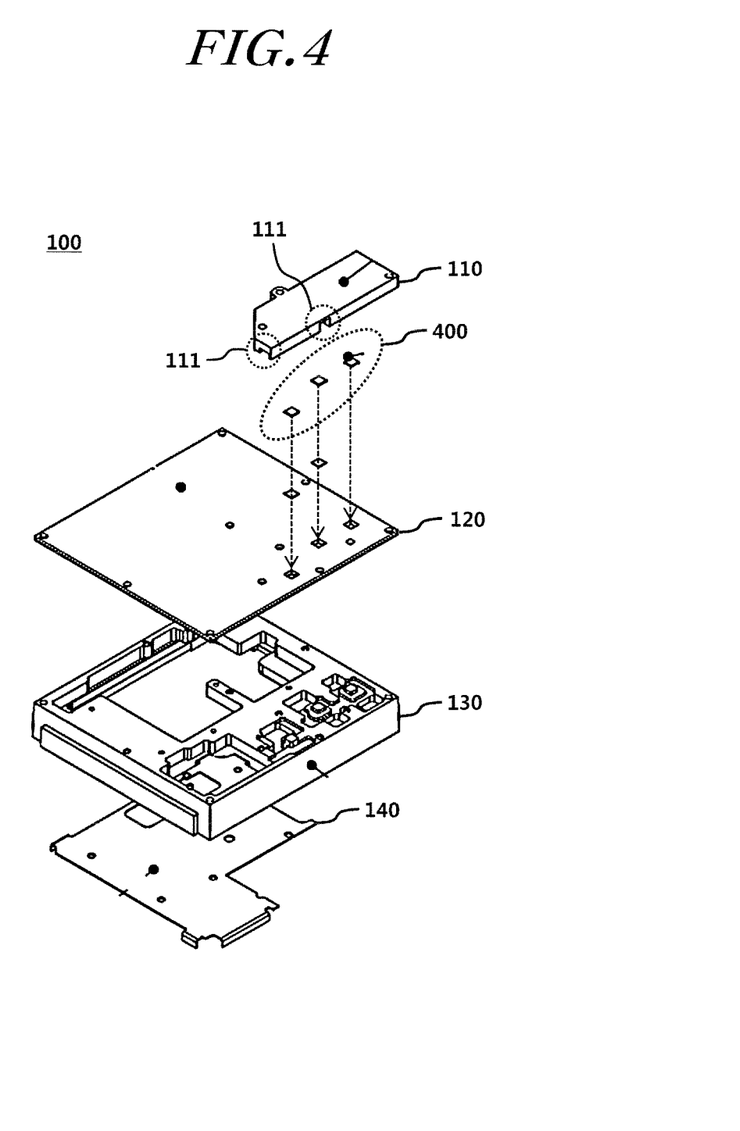
FIG. 4 is an exploded perspective view of a radar apparatus according to a second exemplary embodiment of the present invention.

FIG. 4 illustrates an exploded perspective view of a radar apparatus according to a second embodiment of the present invention.

Referring to FIG. 4, the radar apparatus 100 includes: a first PCB 120 having a top side on which a radar antenna module is mounted, and a bottom side on which a base band circuit module is mounted and an RF circuit module 400 and wire-bonded and seated; a second PCB 140 on which a signal processing circuit module is mounted; and a base plate 130 having a top side which is coupled to the bottom side of the first PCB 120, and a bottom side which is coupled to the top side of the second PCB 140.

As described above, in the radar apparatus 100 according to the present exemplary embodiment, the radar antenna module and the RF circuit module are not mounted on separate PCBs, respectively, and in the present exemplary embodiment, an RF circuit module 400 may be implemented as one chip such that the radar antenna module and the RF circuit module 400 may be configured to be mounted on one single PCB (that is, the first PCB 120). Accordingly, hereinafter, the RF circuit module may be referred to as an "RF device".

The RF circuit module 400 is wire-bonded to and seated on the first PCB 120, in such a manner that one end of the RF circuit module 200 can be connected with the radar antenna module mounted on the top side of the first PCB 120, and the other RF circuit module 200 can be connected with the base band circuit module mounted on the bottom side of the first PCB 120.

The base band circuit module mounted on the bottom side of the first PCB 120 converts an analog signal output from the RF circuit module 400 into a digital signal, and inputs the digital signal to the signal processing circuit module, or converts a digital signal output from the signal processing circuit module into an analog signal, and inputs the analog signal to the RF circuit module 400.

Meanwhile, the radar apparatus 100 may be provided with a protective member 110 which may be coupled to the top side of the first PCB 120 to protect the RF circuit module 200 wire-bonded to and seated on the first PCB 120.

Here, the protective member 110 may be formed from, for example, a metallic material.

The protective member 110 is formed with at least one groove 111 that serves as a passage for a wire for connecting the radar antenna module mounted on the top side of the first PCB 110 and the RF circuit module 200 wire-bonded to the top side of the first PCB 110.

Figure 5:
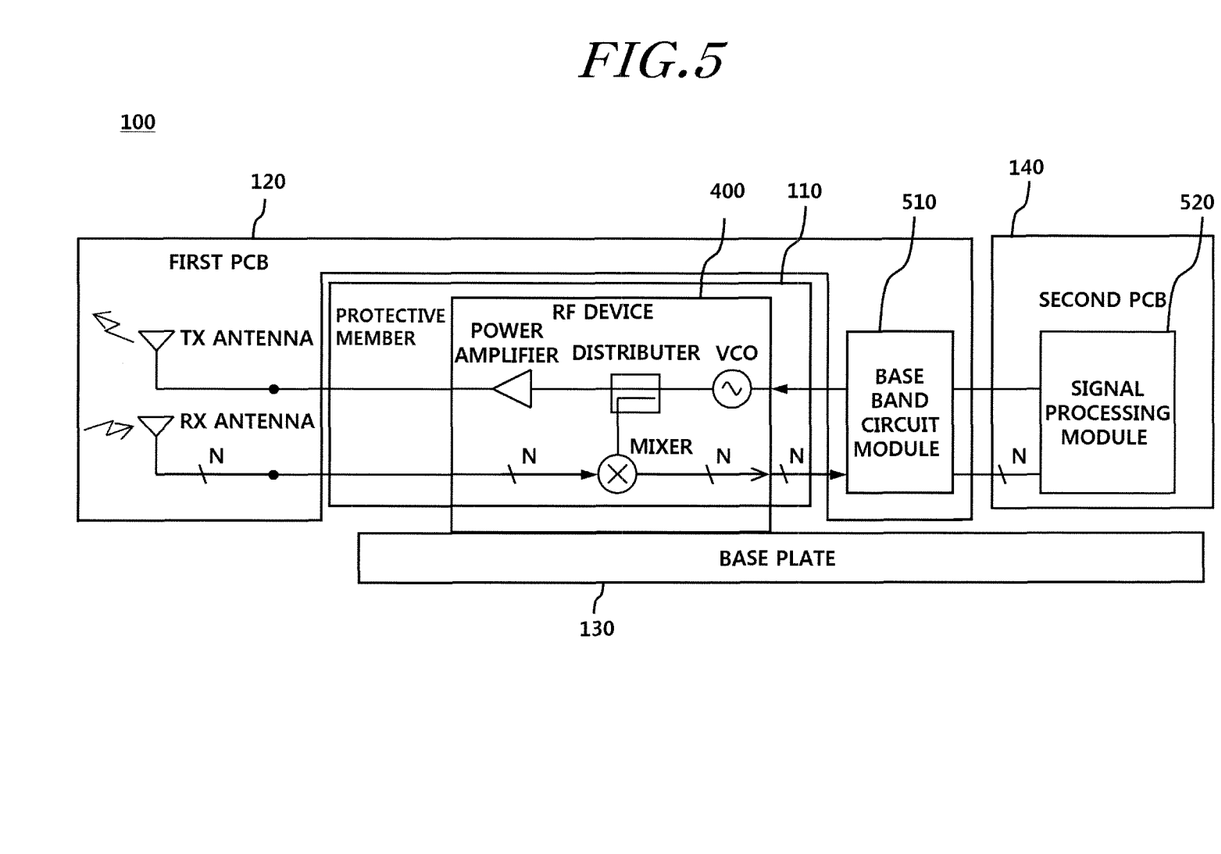
FIG. 5 is a view illustrating a circuit diagram of the second exemplary embodiment of the present invention.

The radar apparatus 100 according to the present exemplary embodiment described above with reference to FIG. 4 may be represented by a circuit diagram as illustrated in FIG. 5.

Referring to FIG. 5, on the top side of the first PCB 120, a radar antenna module (a Tx antenna and an Rx antenna) is mounted, and on the bottom side of the first PCB 120, a base band circuit module 510 is mounted. As illustrated in FIG. 4, the RF circuit module 400 is seated on the first PCB 120 and wire-bonded to the first PCB 120, thereby being connected with the first PCB 120 to form a circuit. In addition, the RF circuit module 200 is protected by the protective member 110.

The base band circuit module 510 mounted on the bottom side of the first PCB 120 is connected with a signal processing circuit module 520 the second PCB 140 to form a circuit.

In addition, the protective member 110, the first PCB 120, the RF circuit module 400, and the second PCB 140 are coupled (assembled) with each other by the base plate 130.

The base plate 130, which serves as a coupling structure, may also serve to transfer heat generated in the radar apparatus 100, and to shield noise.

Now, the top side configuration of the first PCB 120 in the radar apparatus 100 according to the first exemplary embodiment described above with reference to FIGS. 2 and 3, and the radar apparatus 100 according to the second exemplary embodiment described above with reference to FIGS. 4 and 5 will be described with reference to FIG. 6.

Figure 6:
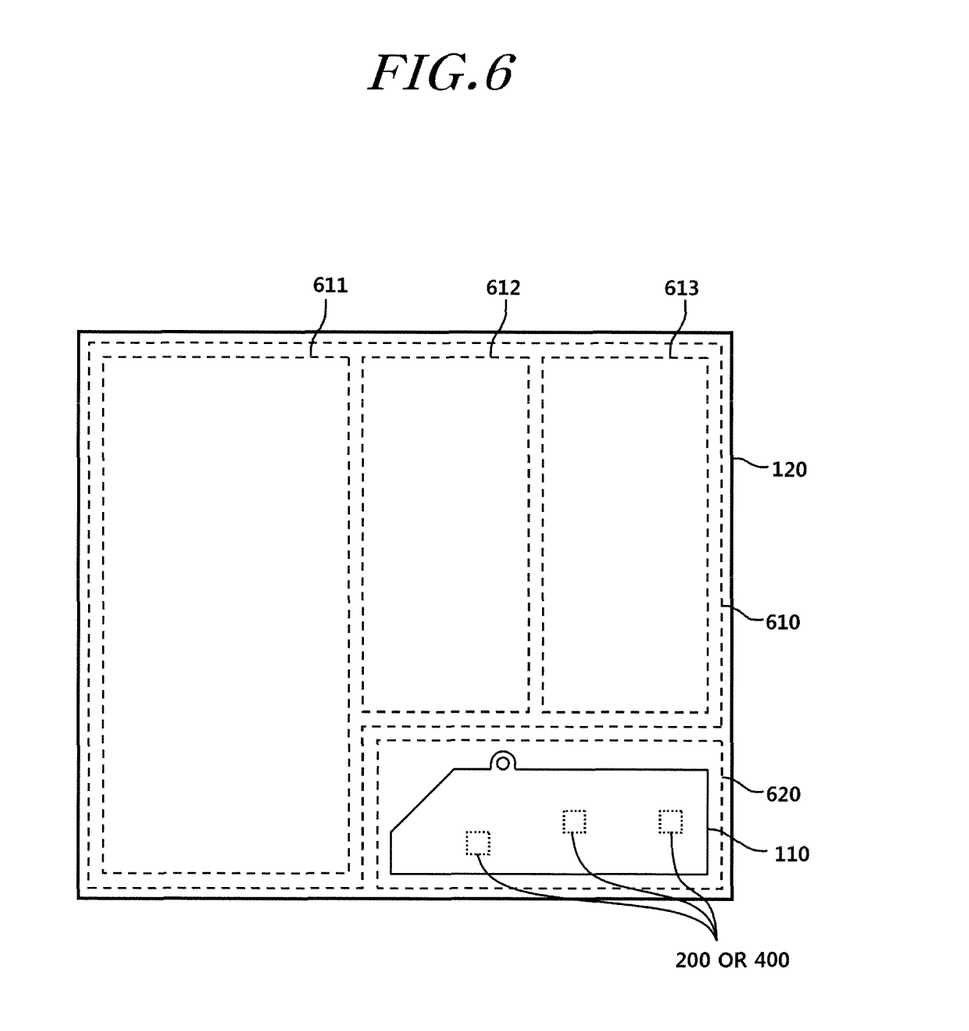
FIG. 6 is a view illustrating a configuration of the top side of the first printed circuit board in the radar apparatuses according to the first and second exemplary embodiments of the present invention.

FIG. 6 illustrates the top side configuration of the first PCB 120 in the radar apparatuses 100 according to the first and second exemplary embodiments of the present invention.

The top side of the first PCB 120 includes a first section 610 in which the radar antenna module is mounted, and a second section 620 in which the RF circuit module 200 or 400 is wire-bonded.

In connection with the second section 620 of the top side of the first PCB 120, the protective member 110 configured to cover and protect the RF circuit module wire-bonded to the second section 620 has a size adapted to cover the second section 620 only.

As a result, the protective member 110 will not produce an obstacle in signal transmission/reception in the radar antenna module mounted in the first section 610 while protecting the RF circuit module.

In connection with the first section 610 of the first PCB 120, the radar antenna module mounted in the first section 610 may include a long-distance transmission antenna implemented by a plurality of array antennas, a short-distance transmission antenna implemented by one or more array antennas, and a reception antenna implemented by a plurality of array antennas.

Accordingly, on the top side of the first PCB 120, the first section 610 includes a portion 611 for patterning the long-distance transmission antenna implemented by the plurality of array antennas, a portion 612 for patterning the short-distance transmission antenna implemented by the one or more array antennas, and a portion 613 for patterning the reception antenna implemented by the plurality of array antennas.

Meanwhile, all the plurality of array antennas of the long-distance transmission antenna may have the same length or one or more array antennas may have a length different from the length of the remaining array antennas.

If the one or more array antennas have different lengths among the plurality of array antennas of the long-distance transmission antenna, the long-distance transmission antenna may have an antenna configuration in which among the plurality of array antennas, the central array antenna has the longest length, and the lengths of the other array antennas are gradually reduced as approaching to the opposite sides from the central array antenna.

Meanwhile, the radar antenna module mounted in the first section 610 of the first PCB 120 may further include a middle-distance transmission antenna implemented by one or more array antennas.

Figure 7:
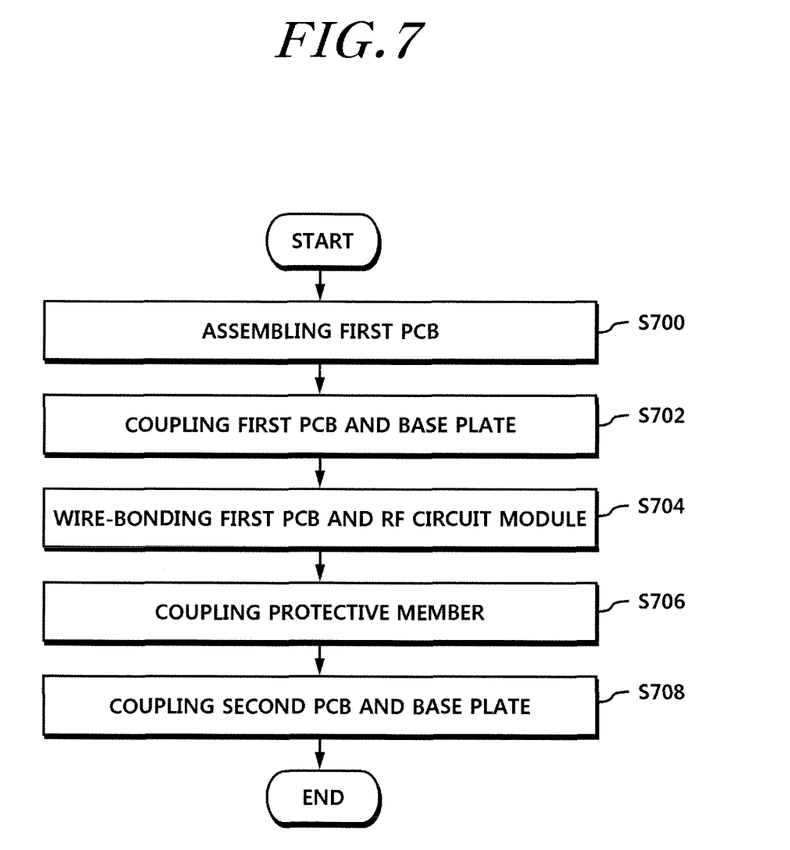
FIG. 7 is a flowchart of assembling a radar apparatus according to another exemplary embodiment of the present invention.

FIG. 7 is a flowchart for a method of assembling the inventive radar apparatus 100.

Referring to FIG. 7, the method of assembling the inventive radar apparatus 100 including the steps of: assembling the first PCB 120 by mounting the radar antenna module on the top side of the first PCB 120 and mounting the base band circuit module on the bottom side of the first PCB 120 (S700), coupling the bottom side of the first PCB 120 to the top side of the base plate 130 (S702), wire-bonding the first PCB 120 and the RF circuit module (S704), and coupling the top side of the second PCB 140 with the bottom side of the base plate 130 (S708).

In the step S704, the RF circuit module may be seated on the base plate 130 through the first PCB 120, or may be directly seated on the first PCB 120 (see FIGS. 2 and 4).

Meanwhile, the method of assembling the inventive radar apparatus 100 may further include the step of coupling a protective member 110 to the top side of the first PCB 120 to protect the RF circuit module wire-bonded to the first PCB 120 after the step S706, as illustrated in FIG. 7.

Although the method of assembling the inventive radar apparatus 100 is described above as being performed in the procedure as illustrated in FIG. 6, this is merely for convenience of description and executing procedures of individual steps may be changed or two or more steps may be incorporated according to an implementation method, and one step may be divided into and executed by two or more steps without departing from the intrinsic concept of the present invention.

As described above, according to the present invention, it is possible to provide a radar apparatus 100 configured to have a reduced size and a reduced number of components and a method of assembling the same.

Through this, a freedom degree for a position where the radar apparatus 100 is loaded in a vehicle or the like can be enhanced.

Even if it was described above that all of the components of an embodiment of the present invention are coupled as a single unit or coupled to be operated as a single unit, the present invention is not necessarily limited to such an embodiment. That is, among the components, one or more components may be selectively coupled to be operated as one or more units. In addition, although each of the components may be implemented as an independent hardware, some or all of the components may be selectively combined with each other, so that they can be implemented as a computer program having one or more program modules for executing some or all of the functions combined in one or more hardwares. Codes and code segments forming the computer program can be easily conceived by an ordinarily skilled person in the technical field of the present invention. Such a computer program may implement the embodiments of the present invention by being stored in a computer readable storage medium, and being read and executed by a computer. A magnetic recording medium, an optical recording medium, a carrier wave medium, or the like may be employed as the storage medium.

In addition, since terms, such as "including," "comprising," and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are not defined otherwise. A term ordinarily used like that defined by a dictionary shall be construed that it has a meaning equal to that in the context of a related description, and shall not be construed in an ideal or excessively formal meaning unless it is clearly defined in the present specification.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A radar apparatus comprising:
   a first printed circuit board having a top side on which a radar antenna module is mounted, and a bottom side on which a base band circuit module is mounted, wherein an RF module is wire-bonded to the first printed circuit board through a hole;

a second printed circuit board on which a signal processing circuit module is mounted; and a base plate having a top side coupled with the bottom side of the first printed circuit board, and a bottom side coupled with the top side of the second printed circuit board.

2. The radar apparatus as claimed in claim 1, wherein a proactive member is coupled to the top side of the first printed circuit board to protect the RF circuit module wire-bonded to the first printed circuit board.

3. The radar apparatus as claimed in claim 1, wherein the protective member is formed with a groove that serves as a passage for a wire for connecting the radar antenna module mounted on the top side of the first printed circuit board and the RF circuit module wire-bonded to the top side of the first printed circuit board.

4. The radar apparatus as claimed in claim 1, wherein the top side of the first printed circuit board comprises a first section in which the radar antenna module is mounted, and a second section in which the RF circuit module is wire-bonded, and wherein the protective member has a size adapted to cover only the second section.

5. The radar apparatus as claimed in claim 1, wherein one end of the RF circuit module is connected with the radar antenna module, and the other end is connected with the base band circuit module.

6. The radar apparatus as claimed in claim 1, wherein the base band circuit module converts an analog signal output from the RF circuit module into a digital signal and inputs the digital signal to the signal processing circuit module, or converts a digital signal output from the signal processing circuit module to an analog signal and inputs the analog signal to the RF circuit module.

7. The radar apparatus as claimed in claim 1, wherein the base plate is formed with a stud on the top side thereof, so that the RF circuit module is seated and assembled through the hole of the first printed circuit board.

8. The radar apparatus as claimed in claim 1, wherein the top side of the first printed circuit board comprises a first section where the radar antenna module is mounted, and a second section where the RF circuit module is wire-bonded, and the radar antenna module mounted in the first section includes a long-distance transmission antenna implemented by a plurality of array antennas, a short-distance transmission antenna implemented by at least one array antenna, and a reception antenna implemented by a plurality of array antennas.

9. The radar apparatus as claimed in claim 8, wherein all the plurality of array antennas of the long-distance transmission antenna have the same length, or one or more array antennas among the plurality of array antennas of the long-distance transmission antenna have different lengths.

10. The radar apparatus of claim 9, wherein in the case where the one or more array antennas among the plurality of array antennas of the long-distance transmission antenna have different lengths, the central array antenna has the longest length, and the lengths of the remaining array antennas are gradually reduced as approaching to the opposite sides from the central array antenna.

11. A radar apparatus comprising:

a first printed circuit board having a top side on which a radar antenna module is mounted, and a bottom side on which a base band circuit module is mounted, wherein an RF circuit module is wire-bonded and seated on the first printed circuit board;

a second printed circuit board on which a signal processing circuit module is mounted; and a base plate having a top side coupled with the bottom side of the first printed circuit board, and a bottom side coupled with the top side of the second printed circuit board.

12. The radar apparatus as claimed in claim 11, wherein a protective member is coupled to the top side of the first printed circuit board to protect the RF circuit module wire-bonded and seated on the first printed circuit board.

* * * * *